United States Patent [19]
Wisor et al.

[11] Patent Number: 5,666,559
[45] Date of Patent: Sep. 9, 1997

[54] FAIL-SAFE COMMUNICATION ABORT MECHANISM FOR PARALLEL PORTS WITH SELECTABLE NMI OR PARALLEL PORT INTERRUPT

[75] Inventors: Michael T. Wisor; Scott C. Johnson, both of Austin, Tex.

[73] Assignee: Advanced Micro Devices, Sunnyvale, Calif.

[21] Appl. No.: 727,287

[22] Filed: Oct. 9, 1996

Related U.S. Application Data

[63] Continuation of Ser. No. 223,643, Apr. 6, 1994, abandoned.

[51] Int. Cl.$^6$ .............................. G06F 11/00; G06F 13/00; G06F 13/42
[52] U.S. Cl. .................... 395/852; 395/849; 395/868; 395/181
[58] Field of Search ................................. 395/849, 852, 395/868, 869, 181; 371/47.1

[56] References Cited

U.S. PATENT DOCUMENTS

| | | | |
|---|---|---|---|
| 4,069,510 | 1/1978 | Carlow et al. | 395/868 |
| 4,159,516 | 6/1979 | Henrion et al. | 395/869 |
| 4,535,404 | 8/1985 | Shenk | 395/879 |
| 4,872,110 | 10/1989 | Smith et al. | 395/185.08 |
| 5,075,874 | 12/1991 | Steeves et al. | 395/112 |
| 5,159,684 | 10/1992 | Kroll et al. | 395/868 |
| 5,325,529 | 6/1994 | Brown et al. | 395/700 |

FOREIGN PATENT DOCUMENTS

| | | |
|---|---|---|
| 60-178561 | 2/1986 | Japan . |

OTHER PUBLICATIONS

Shanley et al., "PCI System Architecture" 3rd ed., Addison-Wesley pub. p. 32, pp. 163–186 1995.

Primary Examiner—Thomas C. Lee
Assistant Examiner—D. Dinh
Attorney, Agent, or Firm—Conley, Rose & Tayon; B. Noel Kivlin

[57] ABSTRACT

A computer system is provided including a processor and a parallel port configured to transfer data to or from a peripheral device. The parallel port includes a data buffer for receiving data transferred on a system bus when the processor executes a write cycle to the parallel port. A control unit associated with the parallel port decodes the address signals of the system bus to selectively latch data within the data buffer, and generates handshake signals to the peripheral device to indicate that write data is presently contained within the data buffer. The peripheral device consequently receives the data and provides an acknowledge signal to the control unit. The control unit thereafter generates a ready signal to indicate to the processor that the data has been written into the peripheral device. A time-out counter is coupled to the control unit to determine whether the peripheral device has returned the acknowledge signal within a predetermined time-out period after the control unit asserts the handshake signal to the peripheral device indicating that data is available at the parallel port. If the time-out period expires and the peripheral device did not return an acknowledge signal, the control unit releases the processor from the current cycle by asserting the ready signal on the system bus. The control unit further asserts an error flag within a status register to indicate that a failure occurred. In response to assertion of the error flag, the control unit asserts an interrupt signal which effectively alerts the processor of a failure. The processor thereafter executes code from an interrupt service routine during which the status register may be read to determine that the failure was associated with the parallel port. The parallel port is also associated with a configuration register that controls whether a non-maskable interrupt or a parallel port interrupt is asserted in response to the assertion of the error flag.

12 Claims, 5 Drawing Sheets

FAIL-SAFE COMMUNICATION ABORT MECHANISM FOR PARALLEL PORTS WITH SELECTABLE NMI OR PARALLEL PORT INTERRUPT

This application is a continuation of application Ser. No. 08/223,643, filed Apr. 6, 1994 now abandoned.

BACKGROUND OF THE INVENTION

1. Field of the Invention

This invention relates to computer systems and more particularly to parallel port circuitry employed within computer systems.

2. Description of the Relevant Art

Parallel ports are widely employed within computer systems to allow a convenient and fast mechanism to transfer data to external peripheral devices such as printers. A parallel port typically includes a data latch which is written with data in response to a write cycle executed by the processor to a predetermined address location. Once this data has been stored within the latch of the parallel port, a control circuit associated with the parallel port causes the data to be transferred to the external peripheral device. The external peripheral device acknowledges receipt of the data and the control circuit responsively returns a ready signal to the processor to release it from the current write cycle.

Parallel ports may further be used to receive data from an external peripheral device. For this situation, the external peripheral typically asserts a parallel port interrupt to the microprocessor to indicate that it is ready to transfer data. The microprocessor responsively executes a read cycle to the parallel port, and the peripheral device asserts an acknowledge signal to indicate that valid data is currently being provided to the parallel port.

Unrecoverable failures may occur within current implementations of parallel port mechanisms if the communication link to the external device is severed or if the communications fail. If the processor executes a write or read cycle to the parallel port and an acknowledge signal is not returned by the peripheral device indicating that it has accepted the write data or that it has provided the read data, the computer system will "hang". In other words, the computer system will wait indefinitely for the peripheral device to provide an acknowledge signal. Once such a situation arises, the computer system must typically be reset or restarted to release the processor.

SUMMARY OF THE INVENTION

The problems outlined above are in large part solved by a computer system including a parallel port circuit having an abort mechanism according to the present invention. In one embodiment, a computer system is provided including a processor and a parallel port configured to transfer data to or from a peripheral device. The parallel port includes a data buffer for receiving data transferred on a system bus when the processor executes a write cycle to the parallel port. A control unit associated with the parallel port decodes the address signals of the system bus to selectively latch data within the data buffer, and generates handshake signals (i.e., a data strobe and a Rd/Wr control signal) to the peripheral device to indicate that write data is presently contained within the data buffer. The peripheral device consequently receives the data and provides an acknowledge signal to the control unit. The control unit thereafter generates a ready signal to indicate to the processor that the data has been written into the peripheral device. A time-out counter is coupled to the control unit to determine whether the peripheral device has returned the acknowledge signal within a predetermined time-out period after the control unit asserts the handshake signal to the peripheral device indicating that data is available at the parallel port. If the time-out period expires and the peripheral device does not return an acknowledge signal, the control unit releases the processor from the current cycle by asserting the ready signal on the system bus. The control unit further asserts an error flag within a status register to indicate that a failure occurred. In response to assertion of the error flag, the control unit asserts an interrupt signal which effectively alerts the processor of a failure. The processor thereafter executes code from an interrupt service routine during which the status register may be read to determine that the failure was associated with the parallel port. To allow programming flexibility, the parallel port is also associated with a configuration register that controls whether a non-maskable interrupt or a parallel port interrupt is asserted in response to the assertion of the error flag. The time-out counter is similarly employed during read cycles of the parallel port to determine whether the peripheral device has acknowledged the read of data within a predetermined time-out period. Polling techniques can further be employed to determine the status of the error flag upon completion of a parallel port operation.

Broadly speaking, the present invention contemplates a parallel port circuit for interfacing a peripheral device to a computer system. The parallel port circuit comprises a data buffer capable of receiving write data from a bus of the computer system, and a control unit coupled to the data buffer and capable of causing the write data to be latched within the data buffer in response to a write cycle on the bus of the computer system. The control unit is further capable of generating a handshake signal to the peripheral device to indicate that the write data is contained by the data buffer. The parallel port circuit further comprises a time-out counter coupled to the control unit which is capable of counting a predetermined time period following the assertion of the handshake signal. If the peripheral device fails to assert an acknowledge signal indicating receipt of the write data within the predetermined time period, the control unit asserts a control signal on the bus of the computer system to release the computer system from the write cycle.

The present invention further contemplates a computer system comprising a processing unit, a peripheral device, and a parallel port circuit coupled to the processing unit through a bus and coupled to the peripheral device. The parallel port circuit includes a data buffer capable of receiving write data from the bus of the computer system, and a control unit coupled to the data buffer and capable of causing the write data to be latched within the data buffer in response to a write cycle to the parallel port executed by the processing unit. The control unit is further capable of generating a handshake signal to the peripheral device to indicate that the write data is contained by the data buffer. The parallel port circuit further includes a time-out counter coupled to the control unit which is capable of counting a predetermined time period following the assertion of the handshake signal. If the peripheral device fails to assert an acknowledge signal indicating receipt of the write data within the predetermined time period, the control unit asserts a control signal on the bus of the computer system to release the processing unit from the write cycle.

The present invention finally contemplates a method for operating a parallel port of a computer system including a processing unit and a peripheral device. The method comprises the steps of executing a write cycle on a bus of the computer system, latching data within a data buffer of the parallel port in response to the write cycle, and providing a data strobe signal to the peripheral device. The method further comprises the steps of initiating the countdown of a predetermined time period, waiting for an acknowledge signal from the peripheral device, and asserting a control signal on the bus to release the processing unit from the write cycle if the acknowledge signal is not provided from the peripheral device within the predetermined time period.

BRIEF DESCRIPTION OF THE DRAWINGS

Other objects and advantages of the invention will become apparent upon reading the following detailed description and upon reference to the accompanying drawings in which.

Figure 1:
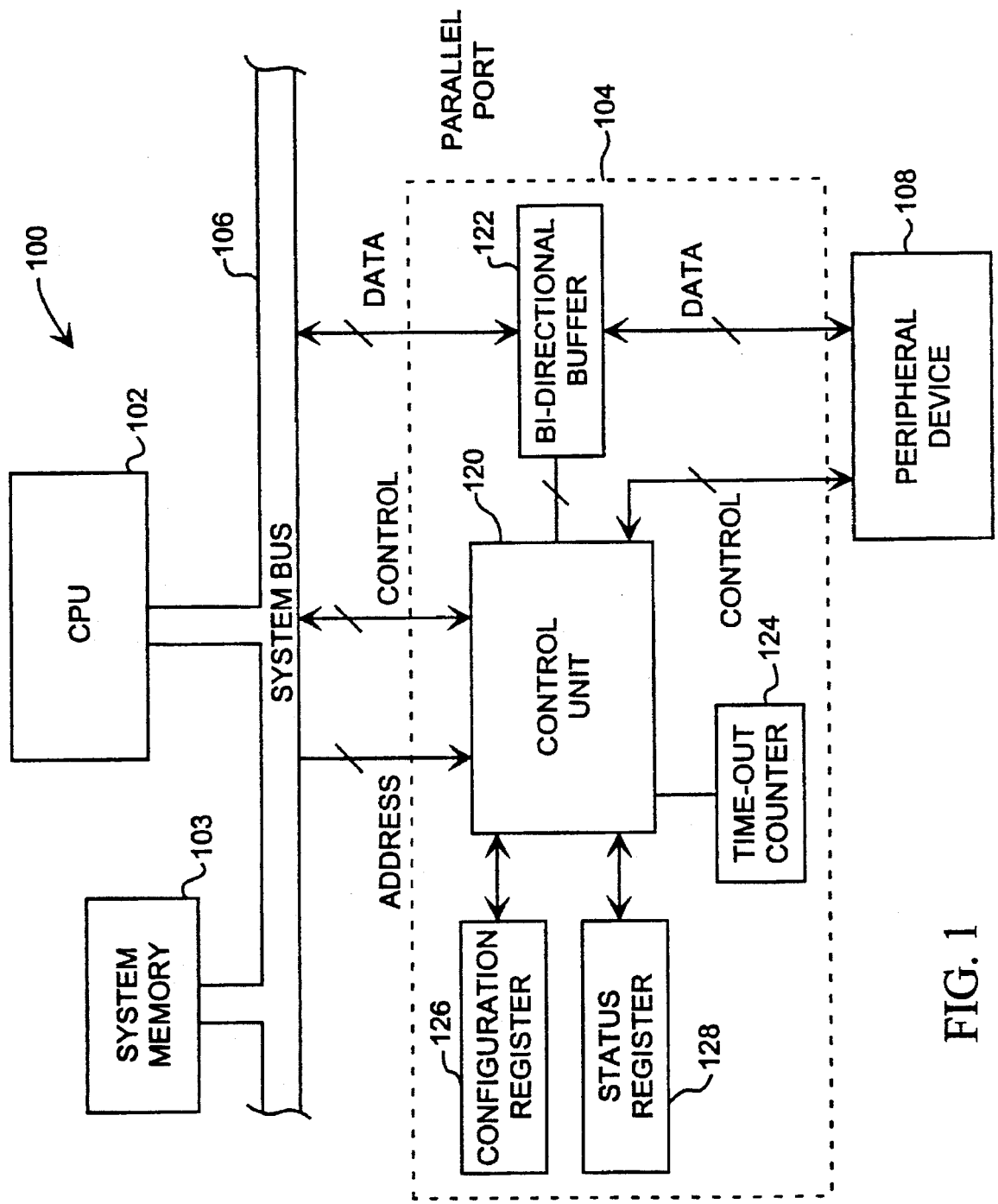
FIG. 1 is a block diagram of a computer system that employs a parallel port including a time-out counter according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system 100 including a microprocessor (CPU) 102 coupled to a system memory 103 and to parallel port 104 via a system bus 106. Parallel port 104 is further coupled to a peripheral device 108.

Microprocessor 102 is a data processing unit that implements a predetermined instruction set. Exemplary processing units include the models 80386 and 80486 microprocessors, among others. System bus 106 is illustrative of, for example, a PCI standard configuration bus, although it is understood that other bus configurations could be employed. It is further understood that parallel port 104 could be coupled to microprocessor 102 through one or more bus interface units, and that microprocessor 102 could be an integrated processor.

Parallel port 104 includes a control unit 120 coupled to a bi-directional buffer 122 and a time-out counter 124. A configuration register 126 and a status register 128 are further coupled to control unit 120. Bi-directional buffer 122 is provided for selectively buffering data between system bus 106 and peripheral device 108. Bi-directional buffer 122 may be implemented with a simple latch circuit.

Control unit 120 monitors system bus 106 to determine whether a write or a read operation to the parallel port 104 is being executed by, for example, microprocessor 102. Parallel port 104 is mapped to a predetermined address location within the I/O space of computer system 106, although it is understood that parallel port 104 could be alternatively mapped within the memory space of computer system 100. Control unit 120 also controls the latching of data within bi-directional buffer 122 and generates appropriate handshaking signals with peripheral device 108 to carry out a specific transfer. This will be explained in greater detail below.

Figure 2:
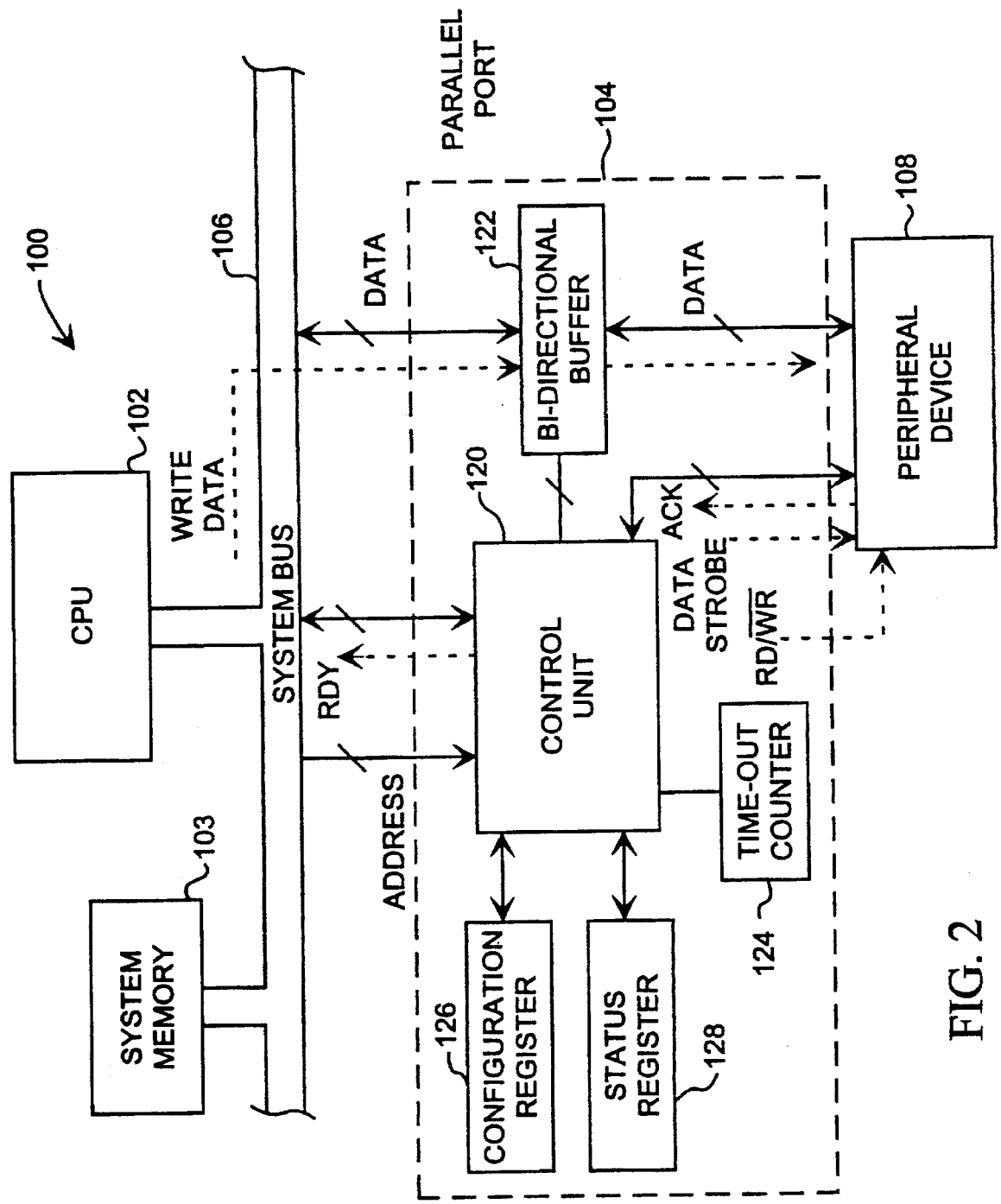
FIG. 2 is a block diagram that illustrates the flow of data and selected signals associated with a write cycle to an external peripheral device.

During operation of computer system 100, if microprocessor 102 executes an I/O write cycle to parallel port 104, control unit 120 detects the cycle and causes the corresponding data on system bus 106 to be latched into bi-directional buffer 122. It is noted that the write data may be sourced from system memory 103. FIG. 2 illustrates the transfer of data and the assertion of selected control signals during such an I/O write cycle to parallel port 104. After control unit 104 causes the data to be latched into bi-directional buffer 122, control unit 120 asserts a write strobe signal to peripheral device 108 to indicate that valid data is currently available at bi-directional buffer 122. Control unit 120 further asserts a read/write (Rd/Wr) control signal low to indicate that the current cycle is a write operation. If the communications link is operating correctly, the peripheral device 108 receives the data from bi-directional buffer 122 and responsively asserts an acknowledge signal ACK which is received by control unit 120. Control unit 120 consequently asserts a ready signal RDY on system bus 106 to indicate to microprocessor 102 that the peripheral device 108 has accepted the data. This portion of the operation is conventional.

When control unit 120 asserts the write strobe, time-out counter 124 begins counting for a predetermined time-out period. In one embodiment, this time-out period is set at 10 microseconds for single byte transfers, at 20 microseconds for single word transfers, and at 40 microseconds for double-word transfers, although it is understood that other time-out lengths could be set depending upon the system. If the communications link is operating correctly, the peripheral device 108 will assert the acknowledge signal ACK within this predetermined time-out period. As a result, as long as the time-out counter 124 does not expire, no additional action is taken by control unit 120 in response to time-out counter 124.

Figure 3:
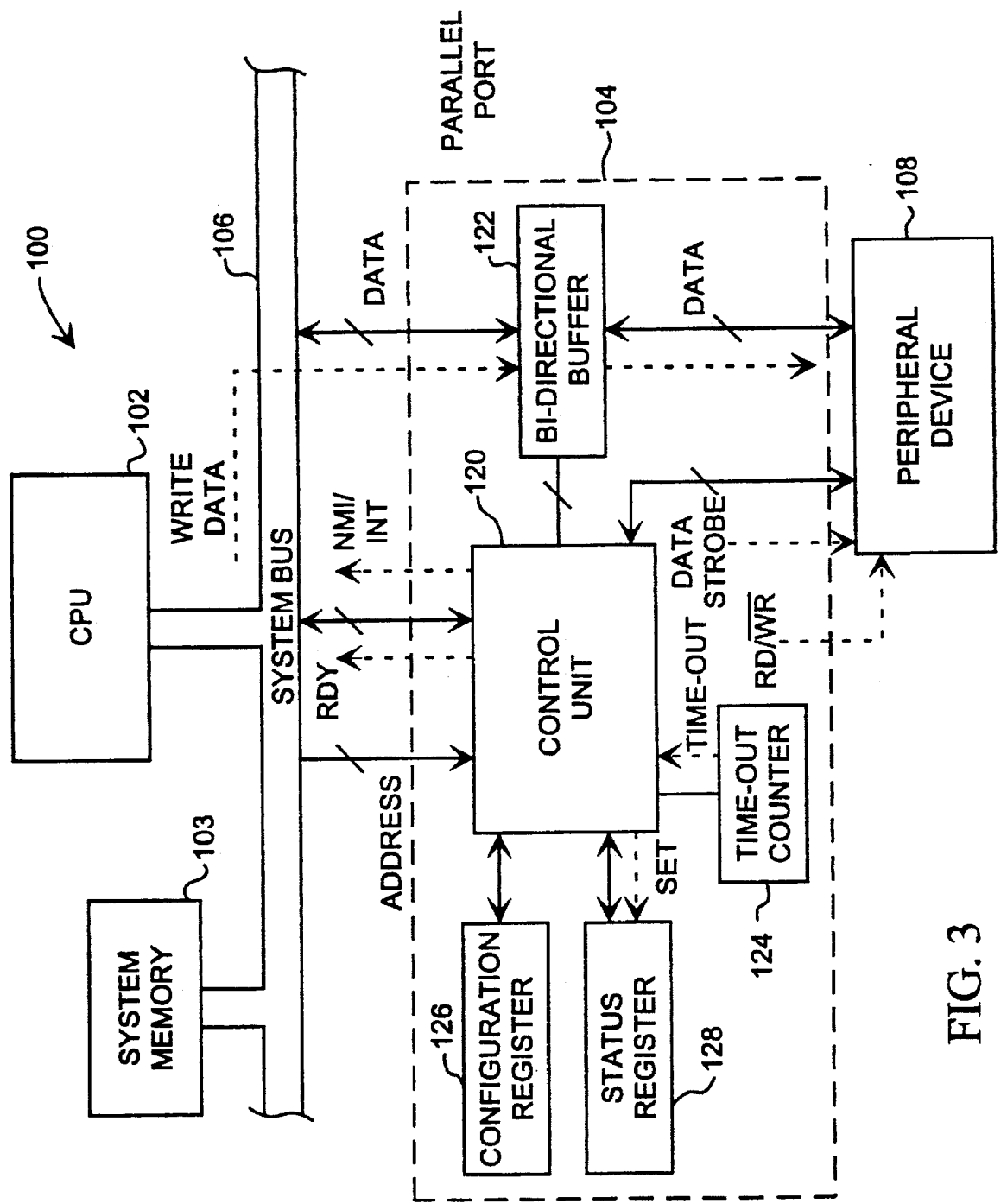
FIG. 3 is a block diagram that illustrates selected control signals asserted when a time-out occurs.

On the other hand, if the communications link is severed or if a communication failure occurs wherein the acknowledge signal ACK is not received by control unit 120 from peripheral device 108, the time-out period of time-out counter 124 will expire. Referring to FIG. 3, this causes an assertion of a time-out signal from time-out counter 124 which is received by control unit 120. Control unit 120 responsively sets an error bit within status register 128, and asserts the ready signal RDY on system bus 106 to release microprocessor 102 from the current cycle. Control unit 120 additionally asserts either a non-maskable interrupt (NMI) or a parallel port interrupt (INT) that is provided to microprocessor 102. Microprocessor 102 thus jumps to the designated interrupt service routine during which an instruction may be executed to read the status register 128 to thereby determine that the error occurred within a parallel port communication. Further diagnostics can be implemented via software to allow the system programmer or user to determine the reason the communications failure occurred and to display the current status of the system. It is noted that since control unit 120 asserts the ready signal RDY, the system does not "hang", and further processing by microprocessor 102 is possible without resetting the system.

Configuration register 126 is provided in associated with parallel port 104 to control whether control unit 120 asserts the non-maskable interrupt (NMI) or the parallel port interrupt (INT) upon the occurrence of a communications failure and the setting of the error bit of status register 128. Depending upon a configuration value stored within configuration register 126, the control unit 120 will assert either the non-maskable interrupt (NMI) or the parallel port interrupt (INT) in response to the setting of the error bit of status register 128. Thus, depending upon the system, the designated service routine (NMI or INT service routine) may be configured to detect, analyze, and provide user information regarding the error. By allowing the system programmer to set which interrupt (NMI or INT) is asserted upon a failure of a parallel port communication, flexible system programming may be accommodated.

Operation of computer system 100 when a parallel port read operation occurs is similar to that described above for a write operation. When peripheral device 108 has data available to be read by microprocessor 102, the parallel port interrupt is asserted by peripheral device 108. Microprocessor 102 responsively executes a read cycle on system bus 106 to read the data from peripheral device 108. In response to the read cycle, control unit 120 asserts the data strobe signal and asserts the Rd/Wr signal high. These handshake signals are received by peripheral device 108, and peripheral device 108 responsively provides the data to bi-directional buffer 122 and simultaneously asserts the acknowledge signal ACK. Control unit 120 then causes the data to be latched within bi-directional buffer 122 and passes the data to system bus 106. Control unit 120 simultaneously asserts the ready signal, indicating that valid data is available on system bus 106. If a communications failure did not occur, the ready signal RDY will be asserted by control unit 120 within the time-out period set by time-out counter 124. It is noted that the time-out counter 124 again begins count-down of the time-out period in response to the assertion of the data strobe signal.

If the communications link is severed or a communications failure occurs, the acknowledge signal ACK may not be returned by peripheral device 108. Accordingly, the time-out period of time-out counter 124 will expire, thus causing the error bit within status register 128 to be set. In response, control unit 124 again asserts either the non-maskable interrupt (NMI) or the parallel port interrupt (INT) in accordance with the configuration register 126, and asserts the ready signal RDY to release the microprocessor from the current cycle. The microprocessor 102 thereafter executes code from either the non-maskable interrupt service routine or the parallel port service routine during which status register 128 may be read to determine that the error occurred within parallel port 104.

Figure 4:
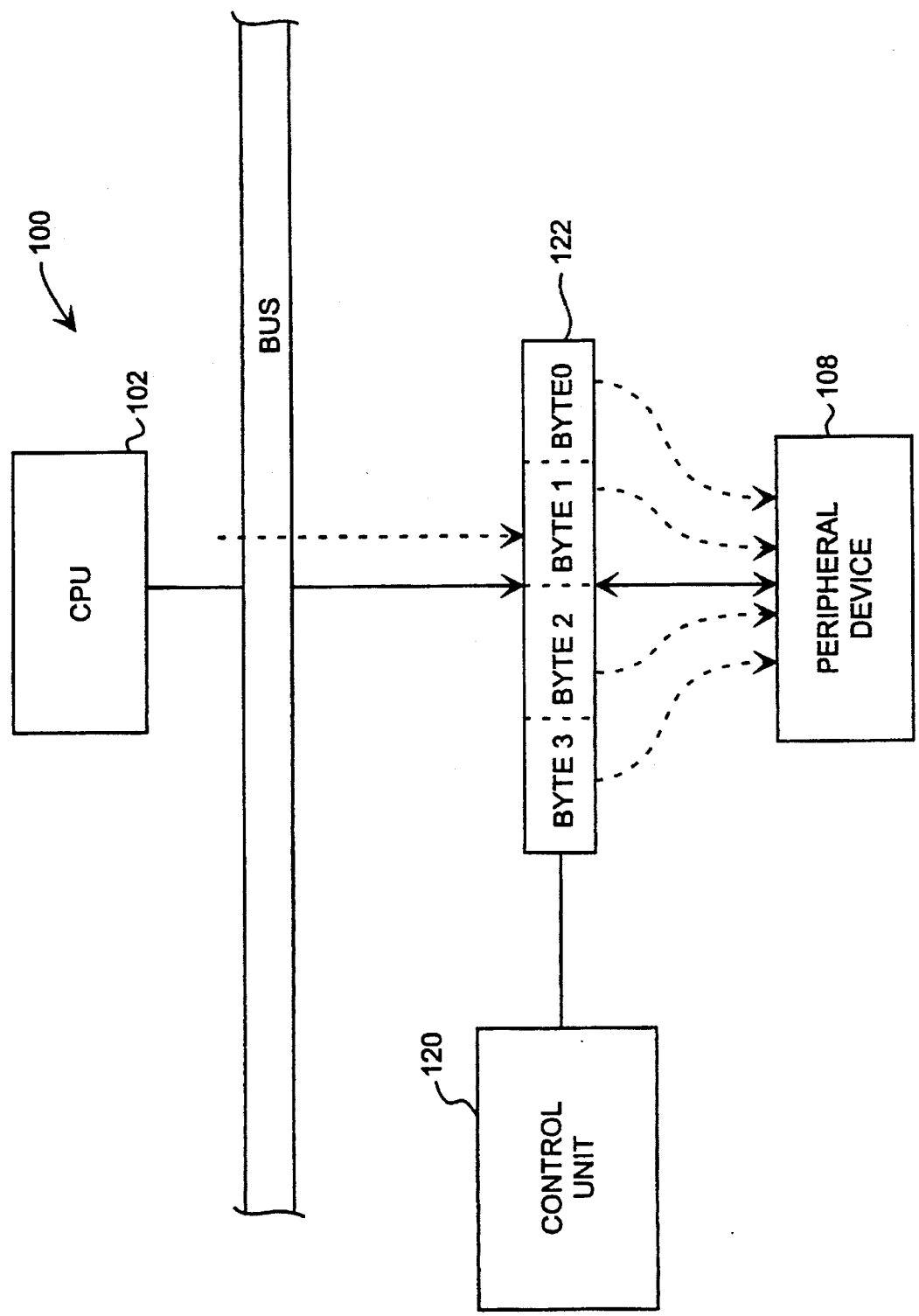
FIG. 4 is a block diagram that illustrates the parsing of a 32-bit word written to the parallel port into four 8-bit bytes of data which are transferred to the peripheral device.

It is noted that control unit 120 may parse data within bi-directional buffer 122 such that, for example, a 32-bit word written from system bus 106 is transferred to peripheral device 108 via four separate 8-bit transfers. Such a transfer is illustrated in FIG. 4, wherein a 32-bit word consisting of Byte3-Byte0 is written into bi-directional buffer 122, and is thereafter transferred to peripheral device 108 on a per-byte basis during four separate data transfer cycles to peripheral device 108. A multiplexer circuit (not shown) may be employed to effectuate such a data transfer using known techniques. Selected portions of computer system 100 have been omitted from the drawing of FIG. 4 for simplicity and clarity.

It is noted that since the control unit 120 caused the ready signal to be asserted even though the communication failure occurred, the data read by microprocessor 102 via parallel port 104 may be invalid. Accordingly, the interrupt service routine may be configured to identify the read data as invalid and to re-execute the read cycle after the cause of the error has been corrected. It is further noted that if additional write or read cycles are executed before microprocessor 102 jumps to the interrupt service routine, the control unit 120 will cause the microprocessor 102 to be released from each cycle in a manner as described below.

In accordance with the computer system 100, a parallel port is provided that employs a time-out counter for detecting whether a peripheral device has acknowledged a particular transfer of data. If a time-out period of the time-out counter expires with no acknowledgment from the peripheral device, the parallel port cycle is effectively aborted by returning a ready signal to the microprocessor to thereby release the processor from the current cycle. An error bit of a status register is further set. An error mode is thereafter entered upon assertion of the non-maskable or parallel port interrupt. As a result, the computer system does not "hang" and need not be reset. After the error has been detected, the error bit of the status register is reset.

Figure 5:
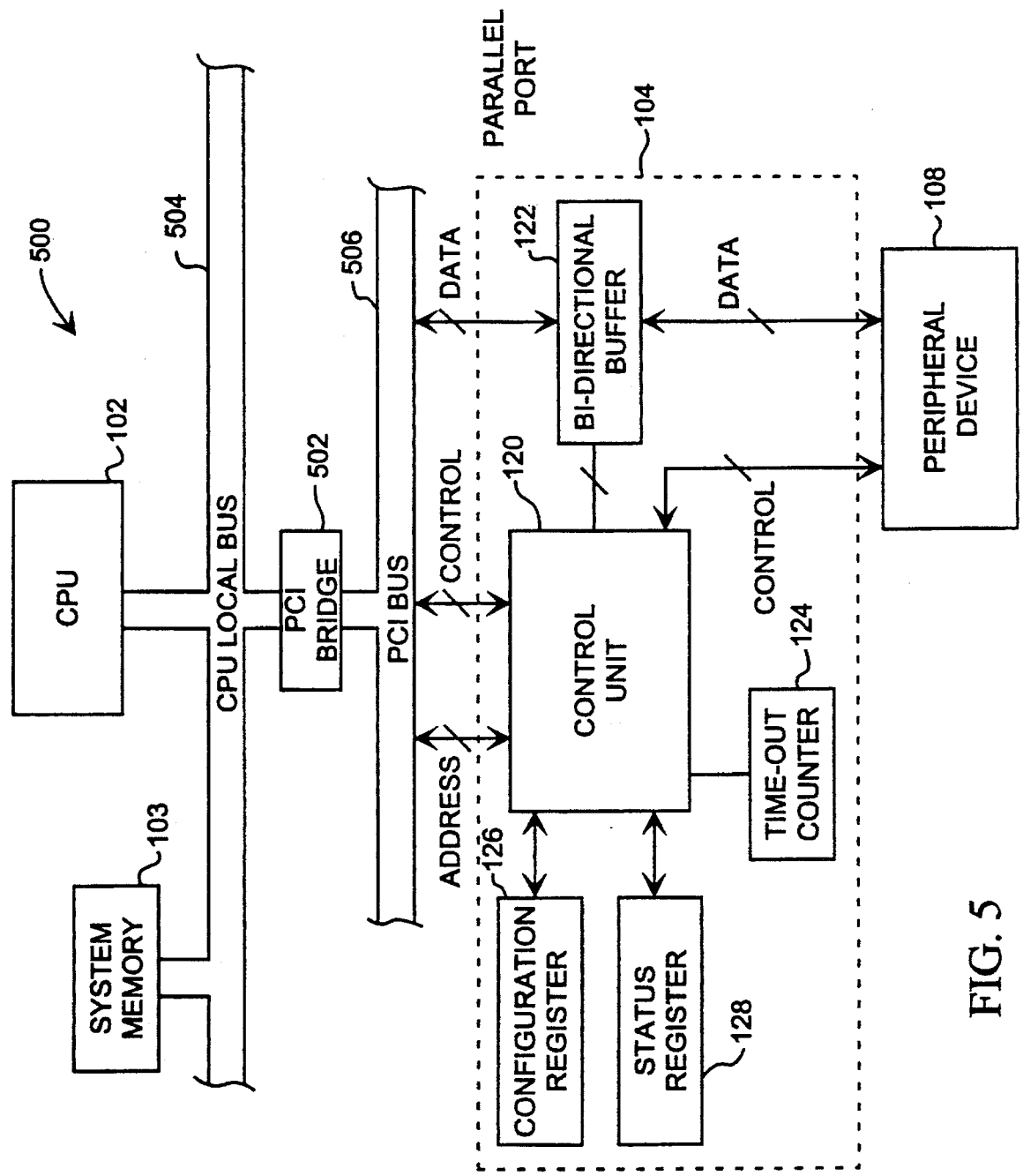
FIG. 5 is a block diagram of a computer system that employs a parallel port including a time-out counter according to another embodiment of the present invention.

Referring next to FIG. 5, a block diagram of a computer system 500 is shown in accordance with another embodiment of the present invention. Circuit portions that correspond to those of FIG. 1 are numbered identically. Microprocessor 102 is coupled to a PCI bridge 502 via CPU local bus 504. PCI 502 bridge is further coupled to parallel port circuit 104 via a PCI bus 506.

Parallel port 104 operates similarly to that described above with reference to FIG. 1. In one embodiment, parallel port 104 may operate in one of two different modes depending upon a configuration value stored within configuration register 126. In a first mode, if a parallel port operation to read data from or write data to peripheral device 108 is executed and a time-out of time-out counter 124 occurs (i.e. peripheral device 108 fails to acknowledge the cycle), control unit 120 causes the execution of a PCI abort cycle on PCI bus 506. As is known to those of skill in the art, a PCI abort cycle can be initiated by control unit 120 by asserting the PCI STOP# signal while deasserting the PCI DEVSEL# signal. In addition to aborting the PCI cycle, control unit 120 further asserts the non-maskable interrupt signal to indicate that an error has occurred.

In a second operating mode of parallel port 104 (as determined by the configuration value within configuration register 126), if a time-out occurs during a parallel port operation, the control unit 120 causes the setting of the error bit within status register 128. Control unit 120 further terminates the PCI bus cycle 506 normally by asserting the PCI TRDY# signal (even though an acknowledge signal was not received from peripheral device 108). Assertion of the PCI TRDY# signal causes PCI bridge 502 to assert a corresponding ready signal on CPU local bus 504 which releases microprocessor 102 from the current cycle. Control unit 120 also asserts the parallel port interrupt signal to indicate the occurrence of an error. Microprocessor 102 subsequently reads the status register 128 to determine that a parallel port failure occurred.

Thus, for the embodiment of FIG. 5, depending upon the configuration value within configuration register 126, the control unit 120 either aborts the PCI cycle when a time-out occurs and asserts the nonmaskable interrupt signal, or asserts the ready signal TRDY# on the PCI bus 506 to release the microprocessor 102 from the current cycle and asserts the parallel port interrupt signal. Flexible programmability and functionality are thereby supported.

It is noted that for both the embodiments of FIG. 1 and FIG. 5, if subsequent read or write cycles to parallel port 104 are initiated after a time-out occurs, control unit 120 terminates the PCI cycle normally but causes any write data (for writes) to be discarded or causes the data bus to be driven with all bits driven low (for reads). The occurrence of the parallel port error will be subsequently detected when the interrupt service routine is entered.

Numerous variations and modifications will become apparent to those skilled in the art once the above disclosure is fully appreciated. For example, it is noted that the time-out period set by time-out counter 124 may vary from system to system, and that the time-out period may be programmable. It is further noted that polling techniques could be employed wherein microprocessor 102 reads status register 128 following a particular parallel port operation to determine whether an error occurred. If such a polling technique is employed, assertion of either the non-maskable interrupt or the parallel port interrupt in response to a time-out may be unnecessary. It is intended that the following claims be interpreted to embrace all such variations and modifications.

What is claimed is:

1. A computer system comprising:
   a processing unit;
   a local bus coupled to said processing unit;
   a peripheral bus;
   a peripheral bus bridge coupled to said local bus and said peripheral bus;
   a peripheral device; and
   a parallel port circuit coupled to said peripheral bus and coupled to said peripheral device, wherein said parallel port circuit includes:
      a data buffer configured to receive write data from said peripheral bus of said computer system;
      a control unit coupled to said data buffer and configured to cause said write data to be latched within said data buffer in response to a write cycle to said parallel port executed by said processing unit, wherein said control unit is further configured to generate a handshake signal to said peripheral device to indicate that said write data is contained by said data buffer;
      a time-out counter coupled to said control unit and configured to count a predetermined time period following said assertion of said handshake signal;
      a status register coupled to said control unit and including an error bit, wherein said control unit is configured to set said error bit if said peripheral device fails to assert an acknowledge signal indicating receipt of said write data before an expiration of said predetermined time period; and
      a configuration register coupled to said control unit, wherein said configuration register is configured to store a configuration value to control whether a non-maskable interrupt signal or a parallel port interrupt signal is asserted in response to said expiration of said predetermined time period;
      wherein, in a first mode of operation set by said configuration value stored in said configuration register, if said peripheral device fails to assert said acknowledge signal indicating receipt of said write data within said predetermined time period, said control unit initiates an abort cycle on said peripheral bus and asserts said non-maskable interrupt signal; and
      wherein, in a second mode of operation set by said configuration value in said configuration register, if said peripheral device fails to assert said acknowledge signal indicating receipt of said write data within said predetermined time period, said control unit releases said processing unit from said write cycle and asserts said parallel port interrupt signal.

2. The computer system as recited in claim 1 wherein said handshake signal includes a data strobe signal.

3. The computer system as recited in claim 1 wherein said data buffer includes a latching circuit.

4. The computer system as recited in claim 1 wherein said predetermined time period of said time-out counter is programmable.

5. The computer system as recited in claim 1 wherein said data buffer is a bidirectional buffer and is configured to receive read data from said peripheral device
   wherein said control unit is configured to cause said read data to be latched within said data buffer in response to a read cycle to said parallel port executed by said processing unit, wherein said control unit is further configured to generate a second handshake signal to said peripheral device to indicate that said read data is required to be provided to said data buffer;
   wherein said time-out counter coupled to said control unit is configured to count a second predetermined time period following said assertion of said second handshake signal;
   wherein said control unit is configured to set a second error bit in said status register if said peripheral device fails to assert a second acknowledge signal indicating receipt of said read data before an expiration of said second predetermined time period; and
   wherein said configuration register is configured to store a configuration value to control whether a non-maskable interrupt or a parallel port interrupt is asserted in response to said expiration of said second predetermined time period;
   wherein, in a first mode of operation set by said configuration value, if said peripheral device fails to assert said second acknowledge signal indicating receipt of said read data within said second predetermined time period, said control unit asserts said non-maskable interrupt signal;
   wherein, in a second mode of operation set by said configuration value, if said peripheral device fails to assert said second acknowledge signal indicating receipt of said read data within said second predetermined time period, said control unit asserts said parallel port interrupt signal.

6. The computer system as recited in claim 5 wherein in response to said non-maskable interrupt signal or said parallel port interrupt signal, read data associated with said read cycle received at said data buffer is identified as valid or invalid and said read cycle is re-executed if said read data is indicated to be invalid.

7. The computer system of claim 1, wherein write data associated with a subsequent write cycle is discarded if said subsequent write cycle is initiated after said predetermined time period.

8. The computer system as recited in claim 1, wherein said peripheral bus is a PCI bus and said peripheral bus bridge is a PCI bridge.

9. The computer system as recited in claim 8, wherein said initiation of an abort cycle includes asserting a PCI STOP signal and deasserting a PCI DEVSEL signal.

10. A method for operating a parallel port of a computer system including a processing unit, a local bus, a peripheral bus, a peripheral bus bridge and a peripheral device, said method comprising:

executing a write cycle on said peripheral bus of said computer system;

latching data within a data buffer of said parallel port in response to said write cycle;

providing a data strobe signal to said peripheral device;

initiating the countdown of a predetermined time period;

waiting for an acknowledge signal from said peripheral device;

initiating an abort cycle on said peripheral bus in a first mode of operation if said acknowledge signal is not provided from said peripheral device within said predetermined time period;

setting an error bit within a status register if said acknowledge signal is not provided from said peripheral device within said predetermined time period; and asserting an interrupt signal to said processing unit if said acknowledge signal is not provided from said peripheral device within said predetermined time period; wherein said interrupt signal is selectable as a nonmaskable interrupt signal in said first mode of operation and a parallel port interrupt signal in a second mode of operation.

11. The method for operating a parallel port of a computer system as recited in claim 10, wherein said peripheral bus is a PCI bus and said peripheral bus bridge is a PCI bridge.

12. The method for operating a parallel port of a computer system as recited in claim 11, wherein said step of initiating an abort signal includes the steps of asserting a PCI STOP signal and deasserting a PCI DEVSEL signal.

* * * * *